United States Patent
Fisher et al.

(10) Patent No.: US 7,296,207 B2
(45) Date of Patent: Nov. 13, 2007

(54) COMMUNICATIONS PROTOCOL

(75) Inventors: Andrew J. Fisher, Cambridge (GB); Said Moridi, London (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 78 days.

(21) Appl. No.: 10/534,656

(22) PCT Filed: Oct. 30, 2003

(86) PCT No.: PCT/IB03/04852

§ 371 (c)(1), (2), (4) Date: May 10, 2005

(87) PCT Pub. No.: WO2004/045186

PCT Pub. Date: May 27, 2004

(65) Prior Publication Data
US 2006/0064622 A1    Mar. 23, 2006

(30) Foreign Application Priority Data
Nov. 13, 2002 (GB) ................................ 0226420.8

(51) Int. Cl.
H03M 13/00     (2006.01)
(52) U.S. Cl. ................. 714/752; 714/758; 714/748
(58) Field of Classification Search ................ 714/752, 714/758, 18, 52, 712, 746, 748, 755; 370/392, 370/402
See application file for complete search history.

(56) References Cited

U.S. PATENT DOCUMENTS 5,195,093 A  *  3/1993  Tarrab et al. ................ 714/703
6,088,337 A      7/2000  Eastmond et al.
6,134,237 A  *  10/2000 Brailean et al. ............. 370/394
6,438,678 B1     8/2002  Cashman et al.
6,643,815 B1 *  11/2003 Davis et al. ................. 714/758
6,732,318 B2 *   5/2004  Collier et al. ............... 714/758
2003/0078006 A1* 4/2003  Mahany ........................ 455/63
2003/0103480 A1  6/2003  You

FOREIGN PATENT DOCUMENTS

EP     0998095 A2    3/2000
EP     0 998 096     5/2000

* cited by examiner

Primary Examiner—Guy Lamarre
Assistant Examiner—Fritz Alphonse
(74) Attorney, Agent, or Firm—Paul Im

(57) ABSTRACT

A method of communicating datagrams between terminals (nodes) of a communications system. In systems operating over unreliable media, redundancy check data can be included in a datagram for use in verifying the integrity of the datagram when received by a terminal; and satisfactory receipt of the datagram can be confirmed by the receiving terminal issuing a response datagram to the originating terminal, for example an acknowledgement. The redundancy check data of a received original datagram (which redundancy check data includes information on the identity of the originating terminal and the content of the datagram) is utilized in the generation of new redundancy check data for the acknowledgement (or other type of response) datagram. The originating terminal receives and processes the response datagram in conjunction with its own local record of the redundancy check data of the original datagram.

10 Claims, 2 Drawing Sheets

COMMUNICATIONS PROTOCOL

The present invention relates to the field of packet-based communications between nodes of a network and in particular to the case where a node is in range of more than one other node.

Communications systems may utilise packets of data to transfer information from one node to another. The data packets transferred may generally comprise two types of data: overhead data and payload data. The overhead data may include data to support the type of protocol employed by the communication system and may also include redundancy check data to support the detection, and optionally the correction, of errors caused to the packet due to communication between nodes. For a particular communications system, it may be an aim to maximise the number of users (nodes) able to share the available and finite capacity of the system. An approach to achieve this is to ensure that packets communicated between nodes are as short as possible.

A node may be in range of (that is, able to receive packets from) more than one other node. A well known method to discriminate between nodes is to employ addressing. A disadvantage of addressing is to increase the overhead of a packet—for a given size of payload the length of a packet is increased which may mean less packets per unit time which in turn may restrict the number of users able to share the system capacity.

An example system may use communication in which a sent packet comprising the address of the sending node is acknowledged by a recipient node. The acknowledgement (for example an acknowledgment packet) might comprise the sending node address. A disadvantage of this method is that the sending node is not able to determine from the content of the acknowledgment packet which (previously sent) packet is being acknowledged.

In another example, nodes of a communication system may utilise packets comprising overhead data, payload data and redundancy check data. In order to provide suitable error protection of a packet, the redundancy check data may be a function of both the overhead data and payload data. A first node may send a message packet to a second node, the packet being of a type requiring an acknowledge. In response, the second node may send to the first node an acknowledge packet comprising the original redundancy check data received in the message packet (and any overhead data necessary to support to the communication system protocol). In this way the second node acknowledges the message packet (since the redundancy check data is a function of both the overhead data and payload data) whilst at the same time minimising the size of the acknowledge packet. A disadvantage of this method is that the redundancy check data within the acknowledge packet is sent unprotected. Errors in the redundancy check data of the acknowledge packet received by the first node might for example (incorrectly) prompt the first node to resend the original message packet to overcome the presumption that a corruption of the message packet received by the second node had occurred.

A method to overcome the above deficiency is to protect the redundancy check data of the original message using additional redundancy check data, both redundancy check data being included in the acknowledge packet. A clear disadvantage of such a method is that the size of the acknowledge packet is increased accordingly.

It is an object of the present invention to provide a solution to these and other problems by means of a method to communicate datagrams between terminals of a communication system.

In accordance with the invention there is provided a method of communicating datagrams between terminals of a communication system, wherein each datagram comprises redundancy check data used to verify datagram integrity, the method comprising the steps of:

generating a first datagram comprising message data and first redundancy check data, which first redundancy check data is computed in dependence on the message data;

sending the first datagram from a first terminal to a second terminal;

verifying the integrity of the first datagram;

generating a second datagram which comprises second redundancy check data, which second redundancy check data is computed in dependence on response data and first redundancy check data;

sending the second datagram from the second terminal to the first terminal;

verifying the integrity of the second datagram;

and, in the case where the integrity of the second datagram is confirmed, identifying that the second datagram is the response to the first datagram.

The present invention is suitable for many types of communication system. In particular it may be suited to packet-based communication between nodes of a network in which there is a possibility that errors occur when a packet is communicated from one node to another. Such errors might be caused by the method used to access a communication channel resulting in for example packet clash (that is, packets sent in the same channel at the same time by different nodes). Although such a limitation can be solved by more complex schemes, the simplicity of such access schemes may give rise to attractive cost advantages. In addition, or alternatively, packets may be corrupted by inherent losses of the communication medium itself, including, but not limited to, losses due to attenuation, multipath or other distortions. Such losses are typical of wireless media, examples of which media include, but are not limited to, radio, laser, infra-red and ultrasonic.

To enable detection of errors, packets sent via a lossy communication medium may comprise redundancy check data. This data may be used by a receiving node to verify the integrity of received packet data. A range of schemes exist to define redundancy check data, including, but not limited to, checksum, Hamming Coding and Cyclic Redundancy Check (CRC). In particular, the CRC is often selected on the basis of being a good compromise between performance (that is, the ability to detect certain types of data errors) and overhead (size of CRC data).

In many practical communication systems, to ensure robustness, the sender of information must have knowledge that the recipient has correctly received the information. Commonly, therefore, the sender requires some form of feedback from the recipient, for example, an acknowledgement that the message has been correctly received. In a situation where there are a number of senders and recipients all in range of (that is, able to communicate with) each other and where a sender is able to address an individual message to a recipient, a problem exists where the recipient needs to address its acknowledgement to the sender and to associate the acknowledgement with the correct original message.

Prior art methods address one or other of these issues, but only address both by compromising the efficiency of the acknowledgement process.

In an example employing the method of the present invention, a communication system comprises a plurality of nodes in which a first node generates a first datagram comprising message data and first redundancy check data, for example but not limited to, a checksum, Hamming code or CRC. Preferably, first redundancy check data is generated using the overhead data (including first node address) and message (or payload) data. In this way the first datagram comprises redundancy check data, which redundancy check data embodies information relating to the source of the message (first node address) and content of the message (payload). Preferably a CRC mechanism is used. The datagram is sent to a second node. On receipt, the second node may test the integrity of the received (first) datagram, for example by calculating redundancy check data from the content of the received datagram according to the agreed method (checksum, Hamming code, CRC, etc., as employed by both the first and second nodes). The calculated redundancy check data may then be compared with the first redundancy check data contained in the received first datagram. If the two redundancy check data correspond then an error-free receipt of the first datagram by the second node is determined. An alternative method of testing the integrity of the received (first) datagram may be to initialise a redundancy check data generator to a known value and then apply the overhead data, payload data and redundancy check data of the received datagram to the generator. The resultant value of the generator may be used to verify the integrity of the received datagram. This method can be employed in the case of CRC, for example a CRC generator may be initialised prior to applying the data of the received datagram. In this example, a subsequent zero value of the CRC generator would signify verification.

Many systems employ so-called positive response whereby error-free receipt of a datagram by a receiving node causes a positive response by the receiving node in that it sends a response datagram back to the sending node. Accordingly, in the present example, the second node may generate a second datagram, which datagram represents a response to the first datagram. The second datagram comprises a second redundancy check data which is computed in dependence on response data and also the first redundancy check data received in the first datagram. An example of such a computation is where a redundancy check data generator may be initialised in dependence on the first redundancy check data (received in the first datagram); response data may then be applied to the generator, the second redundancy check data is then determined in dependence on the value of the generator. It is to be noted that, to minimise size of the datagram, the second node address may be omitted from the datagram since this address is implicit in a datagram responding to the original datagram (first datagram). However, unlike prior art methods, the second redundancy check data by its dependence on the first redundancy check data comprises information related to the identify of the first node and to the payload of the first datagram as well as performing its error detection function for the second datagram. As with the first redundancy check data, the second redundancy check data may be a checksum, Hamming, CRC or other suitable data. Preferably, a CRC is used for the second redundancy check data. In the case of a simple acknowledgement of the first datagram, the second node may generate a second datagram comprising only minimal acknowledgement identifier data (payload data) and the second redundancy check data (and also any overhead data, as necessary, to support the communications protocol employed). Preferably, the acknowledgement identifier data is not included within the second datagram since it may be data common to both first and second nodes and accessible by means of local storage, or any other means. This further reduces the size of the acknowledgement datagram or other datagrams which have a payload data content which is substantially constant.

The second node then sends the second datagram. The first node may be in range of many other nodes and may be awaiting datagrams from one or more nodes as responses to datagrams sent previously by itself. The first node may receive the second datagram. It then may test the integrity of the received (second) datagram, for example by calculating redundancy check data from response data associated with the received datagram and the first redundancy check data, according to the agreed method (checksum, Hamming code, CRC, etc., as employed by both the first and second nodes). The calculated redundancy check data may then be compared with the second redundancy check data contained in the received second datagram. If the redundancy check data correspond then integrity of the second datagram is verified. An alternative method of verifying the integrity of the second datagram is where a redundancy check data generator may be initialised in dependence on the first redundancy check data; then response data and second redundancy check data may be applied to the generator, the integrity of the second datagram being then determined in dependence on the value of the redundancy check data generator. Unlike prior art methods, verification of the second datagram as described above also signifies that the second datagram is a response to an earlier datagram sent by the first node and identifies which particular earlier datagram.

A communications system may comprise nodes or terminals capable to communicate using datagrams embodying aspects of the present invention. The media used by the communications system may be wired or wireless or a combination of the two. In particular, examples of suitable wired systems include, but are not limited to, Ethernet, RS232, UPnP and USB; examples of suitable wireless systems include, but are not limited to, WiFi, 802.11, Low Power radio, Bluetooth and ZigBee. Preferably, terminals of a suitable wireless communications system communicate in accordance with standard IEEE802.15.4.

A communication terminal or node suitable to support aspects of the present invention may comprise:

a first port operable to receive a datagram from another terminal;

a processor operable to:

decode a received datagram;

compute redundancy check data;

compare redundancy check data; and generate a datagram;

a first store operable to store program code instructions;

a second store operable to store redundancy check data;

a second port operable to send datagrams to another terminal; and a third port operable to exchange data with a host application.

Any suitable hardware or hardware/software combination may be utilised to implement a terminal according to aspects of the present invention. In some implementations, non-volatile storage might be used to store the software program code. In addition, or alternatively, an implementation may utilise a redundancy check data generator, for example to implement CRC generation in a node with limited, or no, processing capability.

The advantages of datagrams constructed according to the present invention are that whilst being compact and efficient in utilising scarce communications resource they may also provide protection for the datagram against errors and they may indicate both the source node and specific datagram to which they are related.

Further features and advantages will now be described, by way of example only, with reference to the accompanying drawings in which.

Figure 1:
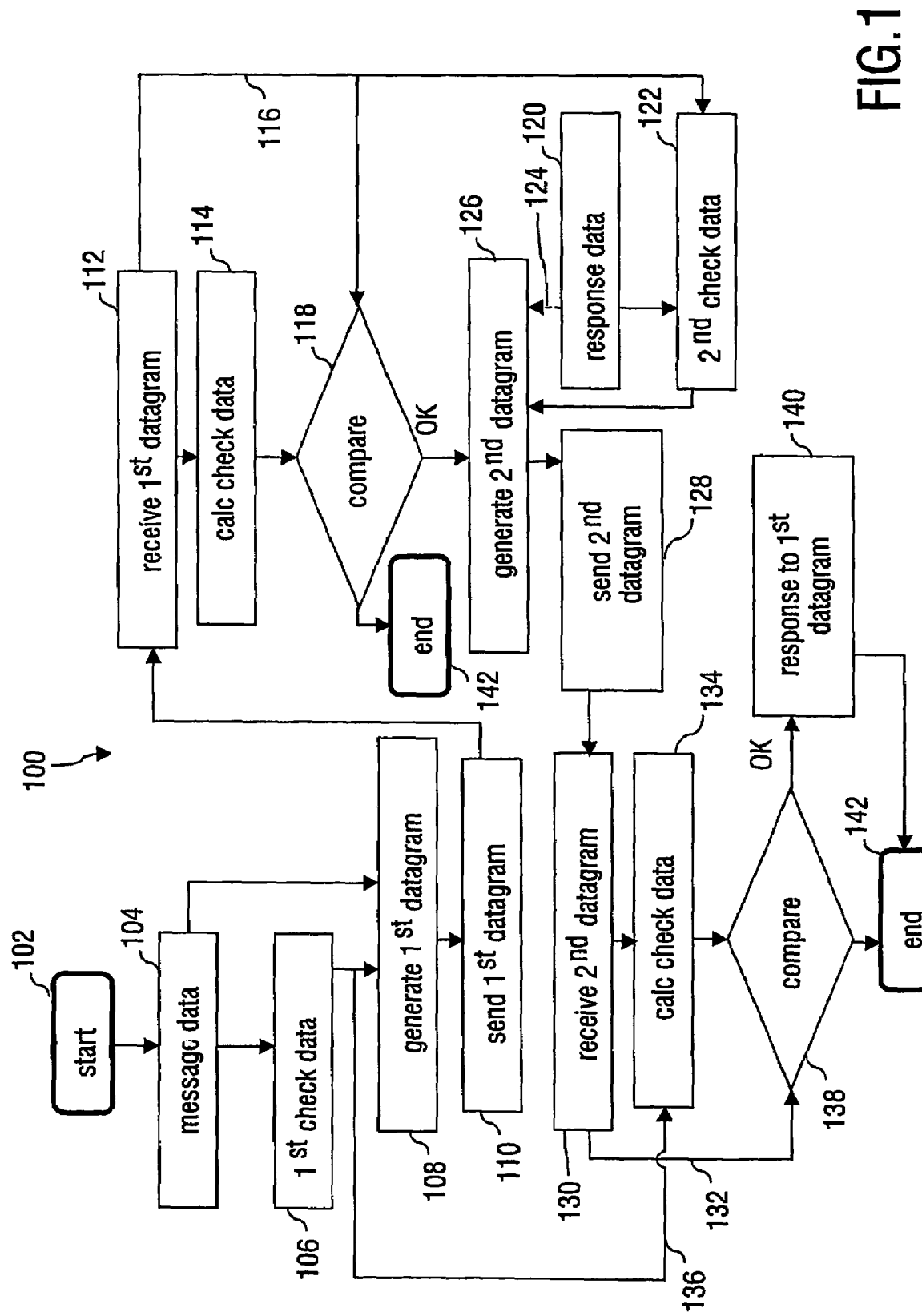
FIG. 1 is a flow diagram of an exemplary method embodying an aspect of the invention.

FIG. 1 shows a flow diagram of an exemplary method embodying an aspect of the invention. The method, shown generally at 100, may be applied by a first and second node within a network of nodes in a communication system. One example might be where the nodes are wireless nodes or terminals operating according to ZigBee and/or IEEE802.15.4 standards. The method starts at 102 where message data is assembled by a first node at 104. This message data might comprise overhead data (for example, but not limited to, first node address, second node address, packet type, framing code, sequence data) and also payload (information) data to be sent from the first node to a second node within the system. Payload information may be handled by the node itself or by data exchange with a host application. Utilising the message data, first redundancy check data 136 is computed 106. Any suitable redundancy check data mechanism may be used. These include, but are not limited to, checksum, Hamming, CRC, etc. The selection of a suitable scheme may depend on the type or types of errors likely to be encountered in the communications channel and perhaps also on available processing power of a communications node. Once the redundancy check data has been computed it may be appended to the message data to generate 108 a first datagram. It is to be noted that the method of the invention does not necessarily require all message data detailed above to be included within a datagram. A node instigating a message may need only to supply information sufficient for an intended recipient node to be able reconstruct the appropriate redundancy check data embodying aspects of the invention. For example, payload data may not need to be included, as is further explained in relation to response data below. The first datagram is sent 110 to a second node.

The second node receives 112 the first datagram. At 114 redundancy check data is calculated from overhead and payload data received in the first datagram. The computation employed by the second node matches that used by the first node and operates on the same data (e.g. overhead and payload data), with the objective to compute identical redundancy check data at both nodes. The calculated redundancy check may then be compared 118 with the first redundancy check data 116 received in the first datagram. If the comparison is false, the method ends 142 since the first datagram received by the second node is corrupted and unreliable. Should the comparison be true, the second node then proceeds to generate 126 a second datagram as a response to the satisfactory receipt of the first datagram. The second datagram comprises second redundancy check data computed 122 in dependence on response data (payload data) 120 and the first redundancy check data 116 that was received in the first datagram. In this fashion, the second redundancy check data is a function of the response data, the identity (e.g. address) of the first node and the content of the first datagram (since the first redundancy check data is itself a function of the latter two items). The second datagram may optionally 124 also comprise the response data; in some common or standard type situations, including, but not limited to, a datagram acknowledging a datagram, a periodic beacon datagram or similar, the response data may be already known to the nodes participating in the communication. For instance, the response data may be stored locally or otherwise be available at each node; it may therefore be inefficient to include and communicate such data in the datagram itself. The second datagram is then sent 128 from the second node to the first node.

On receipt 130 of the second datagram, the first node calculates 134 redundancy check data using data received in the second datagram, the first redundancy check data 136 and response data (provided in the second datagram, or available locally as discussed above; for clarity, not shown in FIG. 1). The calculated redundancy check is then compared 138 with the second redundancy check data received in the second datagram. If the comparison is false, the method ends 142 since the second datagram received by the first node is corrupted and unreliable. Should the comparison be true, the first node then determines that the integrity of the second datagram is true and also that the second datagram represents 140 the response to the first datagram. The method then ends 142. In the example of FIG. 1 a suitable alternative method may be used to verify the integrity of the datagrams, for example the method utilising a redundancy check data generator described earlier.

Figure 2:
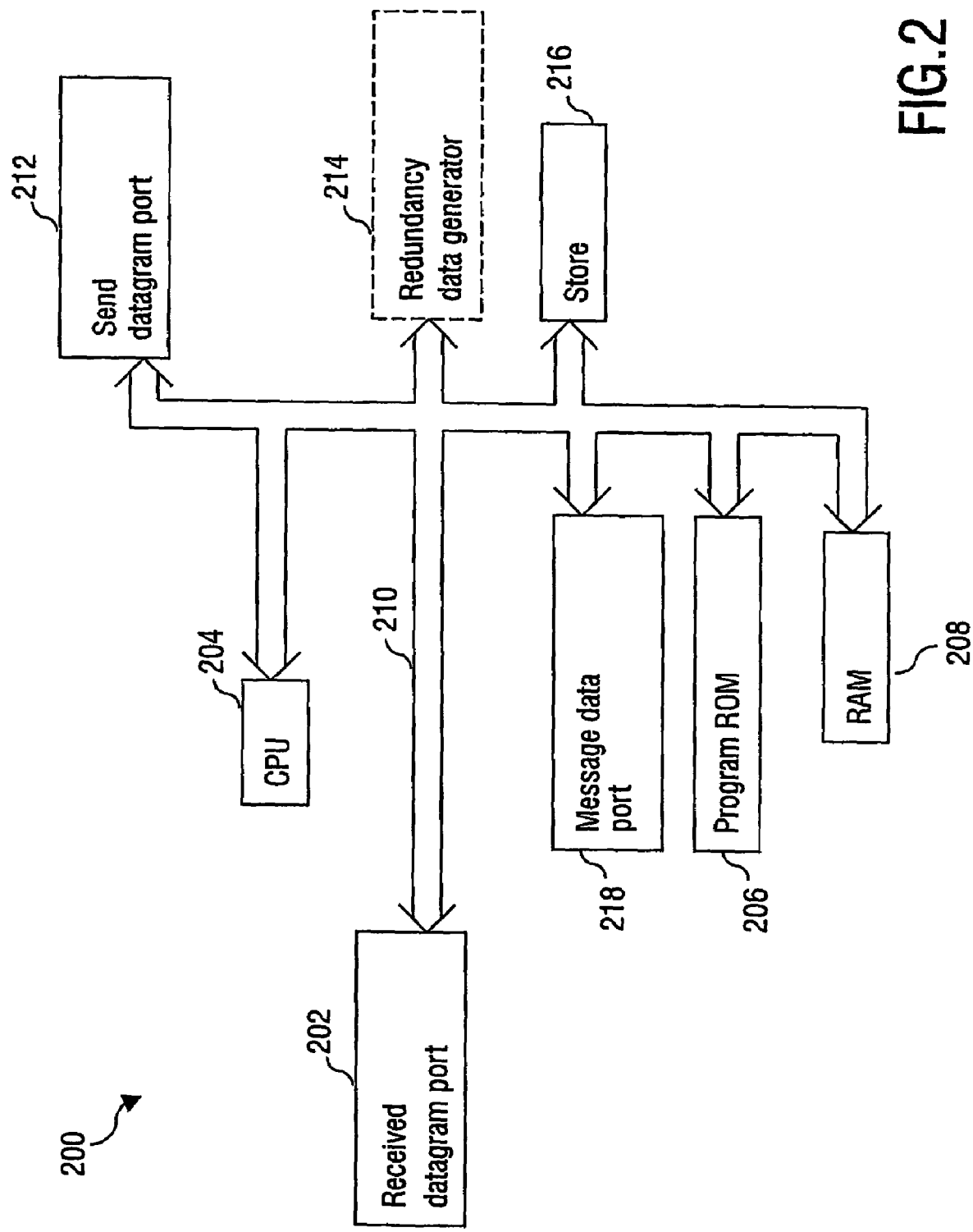
FIG. 2 is a schematic representation of a communication terminal or node.

FIG. 2 shows a schematic representation of a communication terminal or node, shown generally at 200, used in a communications system embodying aspects of the present invention. The node comprises a first port 202 for receiving a datagram, a second port 212 for sending a datagram, a third port 218 for exchanging message data, a CPU 204, ROM 206 for storing program instructions, RAM 208 for temporary storage, store 216 and optional redundancy check data generator 214 all interconnected via bus 210 in known fashion to the person skilled in the art. In operation, under control of the program in ROM, the CPU may acquire message data (locally, or via the third port; which third port may be operable under control of the program to exchange data with for example, a host application situated locally to the node or on a network or the Internet) for sending to another node. The CPU then arranges for redundancy check data to be generated; this may be done by the CPU itself under program control or, alternatively, by a dedicated redundancy check data generator 214. An example of such a generator is a suitably wired shift register which implements a CRC polynomial. For later use, the CPU may arrange to store the value of the generated redundancy check data in store 216. The CPU then assembles a datagram (which includes the generated redundancy check data) and sends the datagram, via any suitable communication protocol, to another node using the second port 212. On receipt of a datagram at input port 202, the CPU may process and validate the datagram in accordance with the program and stored redundancy check data 216.

The foregoing method and implementation are presented by way of example only and represent a selection of a range of methods and implementations that can readily be identified by a person skilled in the art to exploit the advantages of the present invention.

In the description above and with reference to FIG. 1 there is disclosed a method of communicating datagrams between terminals (nodes) of a communications system. In systems operating over unreliable media redundancy check data 136 can be included in a datagram for use in verifying the integrity of the datagram when received 112 by a terminal; satisfactory receipt of the datagram can be confirmed by the receiving terminal issuing 128 a response datagram to the originating terminal, for example an acknowledgement. The present invention utilises the redundancy check data 116 of a received original datagram (which redundancy check data includes information on the identity of the originating terminal and the content of the datagram) in the generation 122 of new redundancy check data for the acknowledgement (or other type of response) datagram. The originating terminal receives 130 and processes 134, 138 the response datagram in conjunction with its own local record of the redundancy check data 136 of the original datagram. In this way, the present invention ensures the response datagram is compact in size whilst enabling the originating terminal not only to verify 138 the integrity of the response datagram but also to recognise 140 the response datagram as being the response to the original datagram.

The invention claimed is:

1. A method of communicating datagrams between a first terminal having a first address, and a second terminal having a second address, of a communication system, wherein each datagram comprises redundancy check data used to verify datagram integrity, the method comprising the steps of:
   generating a first datagram comprising message data and first redundancy check data, which first redundancy check data is computed in dependence on the message data and the first address;
   sending the first datagram from the first terminal to the second terminal;
   verifying the integrity of the first datagram;
   generating a second datagram which comprises second redundancy check data, which second redundancy check data is computed in dependence on response data and the first redundancy check data;
   sending the second datagram from the second terminal to the first terminal;
   verifying the integrity of the second datagram; and
   in the case where the integrity of the second datagram is confirmed, identifying that the second datagram is the response to the first datagram.

2. A method according to claim 1 wherein the step of verifying the integrity of the first datagram comprises the steps of:
   calculating third redundancy check data in dependence on the message data; comparing third redundancy check data with first redundancy check data; and
   determining the integrity of the first datagram in dependence on the comparison.

3. A method according to claim 1 wherein the step of verifying the integrity of the second datagram comprises the steps of:
   calculating fourth redundancy check data in dependence on the response data and first redundancy check data;
   comparing fourth redundancy check data with second redundancy check data; and
   determining the integrity of the second datagram in dependence on the comparison.

4. A method according to claim 1 wherein computing second redundancy check data comprises the steps of:
   initialising a first redundancy check data generator in dependence on the first redundancy check data; applying response data to the redundancy check data generator; and
   determining second redundancy check data in dependence on the value of the first redundancy check data generator.

5. A method according to claim 1, wherein the step of verifying the integrity of the second datagram comprises the steps of:
   initialising a second redundancy check data generator in dependence on the first redundancy check data;
   applying response data of the second datagram and second redundancy check data to the generator, which response data was that used to compute the second redundancy check data; and
   determining the integrity of the second datagram in dependence on the value of the second redundancy check data generator.

6. A method according claim 1, wherein the second datagram further comprises the response data.

7. A communications system comprising a plurality of terminals, wherein each terminal employs the method of claim 1.

8. A terminal for use in the communications system according to claim 7, the terminal comprising:
   a first port operable to receive a datagram from another terminal; a processor operable to:
   decode a received datagram;
   compute redundancy check data;
   compare redundancy check data; and
   generate a datagram;
   a first store operable to store program code instructions;
   a second store operable to store redundancy check data; a second port operable to send datagrams to another terminal; and
   a third port operable to exchange data with a host application.

9. A terminal according to claim 8, in which the first store is non-volatile.

10. A terminal according to claim 8, further comprising a redundancy check data generator.

* * * * *